United States Patent
Spalink et al.

(10) Patent No.: US 7,454,513 B2
(45) Date of Patent: Nov. 18, 2008

(54) INTERFACE LINK LAYER DEVICE FOR LONG DELAY CONNECTIONS

(75) Inventors: Gerd Spalink, Stuttgart (DE); Gralf Gaedeken, Weinsberg (DE); Peter Buchner, Kirchheim Teck (DE)

(73) Assignee: Sony Deutschland GmbH, Cologne (DE)

( * ) Notice: Subject to any disclaimer, the term of this patent is extended or adjusted under 35 U.S.C. 154(b) by 607 days.

(21) Appl. No.: 09/799,748

(22) Filed: Mar. 6, 2001

(65) Prior Publication Data

US 2001/0023452 A1 Sep. 20, 2001

(30) Foreign Application Priority Data

Mar. 7, 2000 (EP) .................................. 00104844

(51) Int. Cl.
*G06F 15/16* (2006.01)
*G06F 13/36* (2006.01)
*H04L 12/56* (2006.01)

(52) U.S. Cl. ................... 709/232; 710/306; 370/395.2; 370/402

(58) Field of Classification Search ................ 709/227, 709/228, 250, 222, 230–232; 710/38, 268, 710/8, 10, 33, 305–306; 713/310; 370/238, 370/395.2, 402

See application file for complete search history.

(56) References Cited

U.S. PATENT DOCUMENTS

| | | | | |
|---|---|---|---|---|
| 5,157,972 | A * | 10/1992 | Broden et al. | 710/100 |
| 5,537,533 | A * | 7/1996 | Staheli et al. | 714/5 |
| 6,016,388 | A | 1/2000 | Dillon | |
| 6,073,194 | A * | 6/2000 | Lowe | 710/100 |
| 6,157,972 | A * | 12/2000 | Newman et al. | 710/100 |
| 6,327,637 | B1 * | 12/2001 | Chang | 710/305 |
| 6,389,496 | B1 * | 5/2002 | Matsuda | 710/316 |
| 6,512,767 | B1 * | 1/2003 | Takeda et al. | 370/389 |
| 6,519,634 | B1 * | 2/2003 | Song et al. | 709/220 |
| 6,694,440 | B1 * | 2/2004 | Ishibashi | 713/310 |
| 6,710,370 | B2 * | 3/2004 | Street et al. | 257/59 |

FOREIGN PATENT DOCUMENTS

| | | |
|---|---|---|
| DE | 198 35 668 | 2/1999 |
| EP | 0 841 791 | 5/1998 |
| EP | 0 848 568 | 6/1998 |
| EP | 0 933 900 | 8/1999 |

* cited by examiner

*Primary Examiner*—Yasin M Barqadle
(74) *Attorney, Agent, or Firm*—Oblon, Spivak, McClelland, Maier & Neustadt, P.C.

(57) ABSTRACT

An interface link layer device for use in a network having a first sub-network having one or more nodes, a second sub-network having one or more nodes and a long delay link via which the first and second sub-networks are connected. The interface link layer device configured to simulate time critical self-ID packets to be effected on the first sub-network based on received information about one or more nodes local to the second sub-network.

9 Claims, 1 Drawing Sheet

INTERFACE LINK LAYER DEVICE FOR LONG DELAY CONNECTIONS

FIELD OF THE INVENTION

The present invention relates to an interface link layer device for a network comprising a long delay link and a method of setting up such a network which comprises at least two sub networks each of which is connected via an interface link layer device according to the present invention to said long delay link. In particular, the present invention relates to a transparent long delay IEEE1394 network.

DISCUSSION OF THE BACKGROUND

The EP 0 848 568 A1 and the European Patent Application with the Application No. 99 126 221.3 which is filed by the Applicant of the present invention and herewith incorporated into this specification describe e.g. coaxial interfaces between two IEEE1394 serial bus systems, i.e. sub networks, to build a distributed IEEE1394 network.

Generally, networks according to the IEEE1394 standard work only with nodes with short, direct interconnections, since very strict timing requirements, e.g. during the self identification phase (in the following self ID phase), have to be fulfilled. For example, standard wired IEEE1394 networks are limited to 4,5 meters length for every cable.

To build networks which are e.g. not only set up in one room, but inside the whole home plastic optic fiber (POF) implementations are known to ensure longer transmission paths. However, these POF implementations have the disadvantage of requiring a new plastic optic fiber cabling inside the home.

On the other hand, coaxial cable is available in many homes, since such cables build the basis for current radio and television reception, but the channel encoding/decoding required when setting up a network with coaxial cable according to the IEEE1394 standard produces a significant delay. Therefore, a transparent self-configuration according to which every node within the network knows which other node is connected as used for a POF implementation is not possible. Wireless transmission is even more convenient, but the transmission technology also produces significant delays for which reason a special adaptation is necessary which is not included within the IEEE1394 standard.

An extension to the IEEE1394 standard, namely the DRAFT IEEE1394.1 standard tries to enable connections of IEEE1394 networks through a bridge, but inherits two main disadvantages, namely that (1) this standard is not 100% backwards compatible, and (2) the controllers within the IEEE1394.1 network must be aware that bridge devices exist, i.e. the IEEE1394.1 network is not fully transparent in both communication directions between two sub networks.

SUMMARY OF THE INVENTION

Therefore, it is the object underlying the present invention to provide a solution for distributed networks including at least two sub networks which are connected by a long delay link, which is backwards compatible and fully transparent in both directions of communication in-between two sub networks.

This object is solved by an interface link layer device according to independent claim 1 which is to be connected in-between a first sub network and a long delay link to which at least one second sub network is connected via another interface link layer device according to the present invention. Preferred embodiments thereof are respectively described in the following dependent claims 2 to 9.

A method to set-up such a network is defined in independent claim 10 and a preferred embodiment thereof is described in the following dependent claim 11.

According to the present invention the main problem of the prior art described above to meet the severe timing requirements, e.g. during the self ID phase in which each network device, i.e. node, identifies itself to the network, i.e. to all other nodes, are met within a distributed network in which at least two sub networks exists which are interconnected by a long delay link, since according to the present invention the interface link layer device which is allocated to one sub network via which this sub network is connected to the long delay link simulates all other sub networks in that at least the timing requirements of nodes connected to said other sub networks are fulfilled. Therefore, in case of a self ID phase when every connected node has to present certain information, e.g. its presence within a certain time frame, the interface link layer device according to the present invention outputs this information of the sub network which it simulates to the sub network to which it is allocated within the given time. Similar in case of requests to nodes connected to other sub networks a request pending message can be sent to the requesting device in advance from the interface link layer device according to the present invention before the "real" answer comes from the device to which the request was addressed.

To initialize or set up such a distributed network all interface link layer devices according to the present invention behave initially like a single node which is connected to the respective sub network. After an initial self ID phase after which all interface link layer devices according to the present invention know the number of nodes and their respective information of the connected sub network to which they are respectively allocated this information is transmitted via the long delay link to all other interface link layer devices according to the present invention. In case a link layer device according to the present invention receives such information it initiates a second self ID phase within the respective connected sub network, e.g. with a bus reset, and behaves during this phase like the number of nodes with the respective information received according to the IEEE1394 standard. Since preferably the nodes within each sub network need not to be configured to have different node IDs, i.e. a node within a first sub network can have the same node ID as another node within a second sub network but the real and virtual nodes within one sub network must have and get automatically assigned different node IDs, the interface link layer device according to the present invention translates in this case node IDs of the addressed virtual, i.e. simulated devices to node IDs that are used in the respective physical sub network which is simulated and vice versa.

After such an initialization and apart from the simulations neccessary to fullfill the given timing requirements the interface link layer devices according to the present invention perform an operation of a link layer device, i.e. to forward data packets from the link in-between at least two sub networks to a sub network and vice versa as it is e.g. described in the above referenced documents.

BRIEF DESCRIPTION OF THE DRAWINGS

The present invention and its embodiments will be better understood from a detailed description of an exemplary embodiment thereof taken in conjunction with the accompanying drawing, wherein.

DESCRIPTION OF THE PREFERRED EMBODIMENTS

Figure 1:
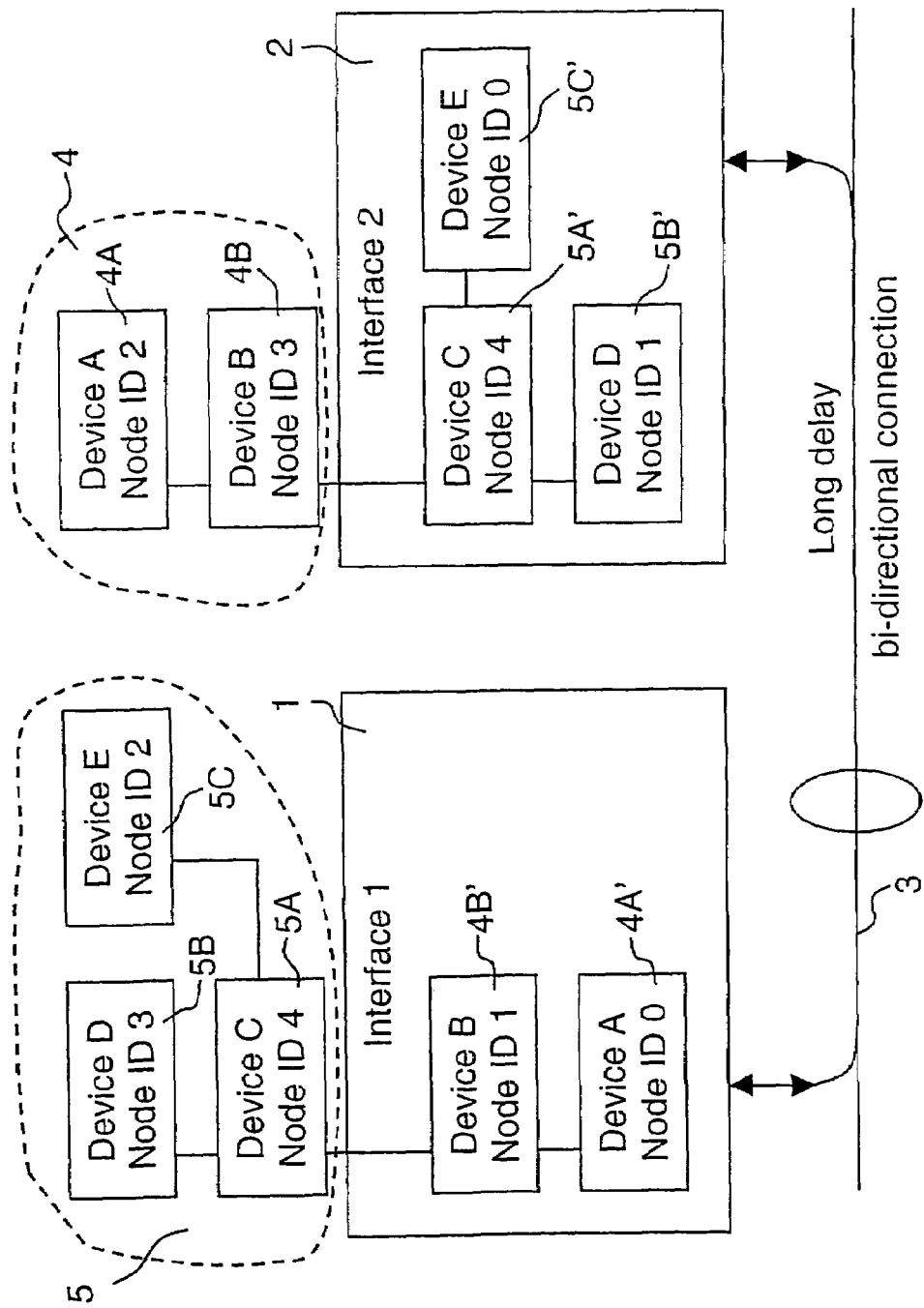
FIG. 1 shows a distributed network including two sub networks connected by a long delay bidirectional connection via a respective interface link layer device according to the present invention.

FIG. 1 shows an IEEE1394 network comprising a first sub network 5 and a second sub network 4 which are connected with each other by a long delay bi-directional connection 3. In-between the first sub network 5 and the long delay bi-directional connection 3 a first interface link layer device 1 is arranged which is allocated to and therefore regarded to belong to the first sub network 5, i.e. which behaves like a network device or node within the first sub network 5. Similar, a second interface link layer device 2 is connected in-between the second sub network 4 and the long delay bi-directional connection 3 which is allocated to and therefore regarded to belong to the second sub network 4.

In the shown example the first sub network 5 comprises 3 nodes, namely a first node 5A which is named device C and has a node ID 4, a second node 5B which is named device D and has a node ID 3, and a third node 5C which is named device E and has a node ID 2. Further, the second sub network 4 comprises a fourth node 4A which is named device A and has a node ID 2 and a fifth node 4B which is named device B and has a node ID 3.

As described in the introductory part of this specification such networks as described above which comprise two or more sub networks connected with each other by a long delay bidirectional connection are known in the prior art, but inherit the drawbacks also mentioned above to be not 100% backwards compatible and fully transparent in both directions of communication, or requiring an expensive fiber optic cabling.

According to the present invention, on the other hand, each of the first interface link layer device 1 and the second interface link layer device 2 has the feature to transmit information about its own sub network 5, 4 to the respective other interface link layer device 2, 1, and based on information received from the respective other interface link layer device 2, 1 simulate the respective sub network 4, 5 the respective other interface link layer device 2, 1 is connected to. Such a simulation is performed by a respective interface link layer device 1, 2 according to the present invention at least during phases with severe timing requirements, such as the self ID phase during which each node of a sub network identifies itself to the sub network.

Therefore, in the shown example the first interface link layer device 1 which is named interface 1 "comprises" the virtual fourth node 4A' which is a simulation of the fourth node 4A, namely of the device A, and the virtual fifth node 4B' which is a simulation of the node 4B, namely of the device B. The second interface link layer device 2 which is named interface 2 "comprises" the virtual first node 5A' which is a simulation of the first node 5A, namely of the device C, the virtual second node 5B' which is a simulation of the second node 5B, namely of the device D, and the virtual third node 5C' which is a simulation of the third node 5C, namely of the device E.

The respective interface link layer device 1, 2 according to the present invention behaves like the number of nodes about which it received information so that new node identifiers are automatically assigned during a self ID phase to the virtual nodes according to the IEEE1394 standard to secure that within each of the sub networks 5, 4 no conflicts occur. Therefore, within the first sub network 5, e.g. the node identifiers 2 to 4 are assigned to the physical nodes 5A to 5C and node identifiers different to 2 to 4 to the virtual fourth and fifth node 4A' and 4B' within the interface link layer device 1, in the shown example the node ID 0 for the virtual fourth node 4A' and the node ID 1 for the virtual fifth node 4B'. Similar, within the second sub network 4 the node identifiers 2 and 3 are assigned to the physical fourth and fifth nodes 4A and 4B and node identifiers different thereto are assigned to the virtual first to third nodes 5A', 5B' and 5C' within the second interface link layer device 2, for example as shown in FIG. 1, the node ID 4 for the virtual first node 5A', the node ID 1 for the virtual second node B', and the node ID 0 for the virtual third node 5C'.

To be able to properly simulate the respective other sub network, i.e. the respective sub network a respective interface link layer device is connected to not directly, but only via the long delay link, the following initialization procedure is performed:

Initially, the first sub network 5 and the second sub network 4 behave and act as independent networks respectively comprising the network devices and an interface link layer device which acts as a normal network device or network controller. Therefore, in the initial phase during which both interface link layer devices 1, 2 behave like a single node the first sub network 5 knows after a self ID phase that it comprises four nodes, namely the first to third nodes 5A to 5C and the first interface link layer device 1. Since this information is distributed within the whole first sub network 5 also the first interface link layer device 1 is able to collect the necessary information about the network topology of the first sub network 5. Similar, after the initial self ID phase of the second sub network 4 the interface link layer device 2 knows that the second sub network 4 comprises the fourth node 4A, the fifth node 4B, and the second interface link layer device 2.

After such a self ID phase within one of the sub networks 5, 4 during which a respective interface link layer device 1, 2 collected new information such information is distributed via the long delay bidirectional connection 3 to the respective other interface link layer device 2, 1. In the shown example, for performing the self ID phase, this information might comprise the number of nodes connected to a respective sub network and their name. In this way the first interface link layer device 1 gets the information that the second sub network 4 comprises two network devices apart from the second interface link layer device 2, namely the fourth node 4A, i.e. the device A and the fifth node 4B, namely the device B, and the second interface link layer device 2 gets the information that the first sub network 5 comprises three devices apart from the first interface link layer device 1, namely the first node 5A, i.e. the device C, the second node 5B, namely the device D, and the third node 5C, namely the device E.

Preferably, both interface link layer devices 1, 2 should also know the whole network topology, i.e. the topology of each sub network 5, 4.

Finally, after receiving such an information via the long delay bi-directional connection 3 each of the interface link layer devices 1, 2 according to the present invention initiates a second self ID phase within the own connected sub network, e.g. with a bus reset. During this second self ID phase which is initiated since the respective interface link layer device according to the present invention received information about another sub network, the interface link layer device 1, 2 which received such information simulates a certain number of nodes according to the information received. Therefore, the first interface link layer device 1 simulates the second sub network, namely the fourth device 4A and the fifth device 4B, and the second interface link layer device 2 simulates the first sub network, namely the first to third nodes 5A to 5C. This simulation is performed strictly according to the IEEE1394 standard, e.g. the first interface link layer device 1 sends two self ID packets to the first sub network 5 and represents two node IDs after the self ID phase. Likewise, the second interface link layer device 2 sends three self ID packets and represents three node IDs after the self ID phase. During this second self ID phase the node identifiers within a sub network are newly assigned according to the IEEE1394 standard. Therefore, to properly set-up a node ID translation table within each of the interface link layer devices 1. 2 an information about the new node IDs is exchanged in-between all connected interface link layer devices 1, 2.

A bus reset to initiate a new self ID phase is always carried out in case a device is newly connected to an IEEE1394 bus, removed therefrom or a device requests it. Therefore, based on this automatic self configuration mechanism defined within the IEEE1394 standard, also the network set-up according to the present invention is always kept in a transparent self configured state, since an interface link layer device 1, 2 according to the present invention collects the information of the connected sub network 5, 4 in case of a not self initiated self ID phase and transmits it to another interface link layer device 2, 1 connected to the long delay link 3 which in turn initiates a new self ID phase within the respective own connected sub network as described above.

Preferably, if an interface link layer device according to the present invention already comprises information about another sub network, this information is also used during a not self initiated self ID phase to simulate this other sub network for the purpose of speeding up the whole self ID phase within the whole network. Further preferably, in case an interface link layer device according to the present invention receives an information from another interface link layer device which is not different to the information already received, no self initiated self ID phase is initiated by said interface link layer device.

Since the node identifiers of the virtual nodes simulated within the interface link layer device according to the present invention are changed in respect to the nodes which are simulated the interface link layer device according to the present invention also translates the node IDs in packets that are sent to the other side of the long delay link 3 on basis of the node ID translation table which is set up after the second above-described self ID phase as described above.

To properly simulate a respective sub network 4, 5 a respective interface link layer device 1, 2 preferably simulates not only the number of nodes within the respective other sub network 4, 5, but also the topology, i.e. the connection scheme of the respective nodes. Therewith, within each of the sub networks 4, 5 the whole network is build up by physical and virtual nodes according to the same topology as if a normal link would be present instead of the interface link layer devices 1, 2 according to the present invention and the long delay link 3. This scheme is also shown in FIG. 1 in which the device C, i.e. the first node 5A. builds the root of the first sub network 5 to which the devices D and E, namely the second and third nodes 5B and 5C, are respectively directly connected, and in which the device B, namely the fifth node 4B, builds the root of the second sub network 4 to which the device A, namely the fourth node 4A, is directly connected, and in which the link in-between said both sub networks 5, 4 is set up in-between both roots, i.e. in-between the first node 5A and the fifth node 4B.

Since the above example is based on the IEEE1394 standard and the number of nodes should be addressed with node IDs only, i.e. the bus ID of the IEEE 1394 physical layer is not used, the number of nodes connected to the interface link layer devices is limited to 63, i.e. the whole network can have a maximum of 63 connected devices which each represent an own node.

According to the present invention the long delay bidirectional connection 3 might have a delay larger than timeouts defined according to the IEEE1394 standard, e.g. in the order of 100 µs . . . 10 ms, since for larger delays asynchronous IEEE1394 transactions may fail, because timing requirements are not met. However, in case the appropriate information is transmitted after the initial self ID phase from one interface link layer device to another interface link layer device this other interface link layer device can not only simulate the respective other sub network during the self ID phase to meet the timing requirements, but also during normal operation, e.g. by distributing commands or answers to the connected sub network which indicate that the respective addressed device which is simulated by the interface link layer device needs some time to process the answer, or by locally storing all or some registers of a device to be simulated within the interface link layer device, since a command to a device can always be seen as a read request to a respective device according to the IEEE1212 standard which defines the control and status register architecture as a higher layer of the IEEE1394 standard. For example, the respective bus info block defining the capabilities of a device/node can be stored within the interface link layer device according to the present invention.

The long delay link 3 through which the interface link layer devices according to the present invention communicate might be a coaxial cable, a wireless, an infra-red, an asynchronous transfer mode (ATM) which is used for professional long distance, high speed data connections, an unshielded twisted pair (UTP), a plastic optic fibre (POF) and/or another appropriate connection, e.g. a combination of the aforesaid types of connections. Such a connection is assumed to be static. If the network topology on one side, i.e. within one sub network, changes, the sub network on this side reconfigures itself by the standard IEEE1394 mechanism and the new network topology information or further information required to properly simulate this sub network is transmitted to the other interface link layer device whereafter this other interface link layer device performs a new self ID phase within the connected sub network.

Since the interface link layer devices according to the present invention only require an own node identifier during a self ID phase during which they do not simulate another sub network no node identifiers are "wasted" during operation, since in this case only node identifiers for the simulated devices are needed.

Of course, the present invention is not limited to a network consisting of two sub networks, but can also comprise three or more sub networks connected to the same long delay bidirectional link 3. In this case the communication on the long delay link 3 may be organized in packets or in channels as described in the above-referenced European Patent Application 99 126 221.3 and each interface link layer device simulates two or more sub networks.

In case no node at all is connected to one sub network, i.e. only the interface link layer device according to the present invention is present within this sub network it is possible that the link in-between this interface link layer device and the other interface link layer devices connected through the long delay link 3 has not to be established and therefore the respective other interface link layer devices will not simulate nodes of this particular sub network. In case the whole network would only comprise two interface link layer devices the interface link layer device connected to the "existing" sub network might behave like a simple IEEE1394 repeater.

According to the invention a distributed network including a long delay link can be built up compatible with existing IEEE1394 devices. These devices need not to know that a long delay connection exists when they communicate with a device simulated inside one of the interface link layer devices. Therefore, according to the present invention a distributed IEEE1394 network including a long delay link is built up which is completely transparent and retaining all the advantages of the IEEE1394 standard.

Of course, the invention can also be applied to other communication standards to set-up long delay links while fulfilling timing requirements.

The invention claimed is:

1. An interface link layer device for use in a network comprising a first sub-network having one or more nodes, a second sub-network having one or more nodes and a long delay link via which said first and second sub-networks are connected, said interface link layer device comprising:
    means for interconnecting said long delay link and said first sub-network;
    means for receiving information about said one or more nodes of said second sub-network stored at another link layer device, which is configured to interconnect said long delay link and said second sub-network;
    means for initiating a first self-ID phase within said first sub-network due to a connecting/disconnecting of a node to at least one said first sub-network and said second sub-network, wherein after said first self-ID phase said interface link layer device has a node ID;
    means for self-initiating a second self-ID phase within said first sub-network after said first self-ID phase, wherein after said second self-ID phase said interface link layer device has no node ID and is transparent to said one or more nodes of said first sub-network; and
    means for simulating in lieu of at least one of said nodes of said second sub-network, time critical self-ID packets to be effected on said first sub-network based on said received information about said one or more nodes of said second sub-network, wherein a simulation takes place during said second self-ID phase.

2. An interface link layer device for use in a network comprising a first bus having one or more nodes local thereto, a second bus having one or more nodes local thereto and a bridge via which said first and second busses are connected, said interface link layer device comprising:
    means for interconnecting said bridge and first bus; and
    means for receiving information about said one or more nodes local to said second bus stored at said second bus;
    means for initiating a first self-ID phase on said first bus due to a connecting/disconnecting of a node local to said first bus, wherein after said first self-ID phase said interface link layer device has a node ID;
    means for self-initiating a second self-ID phase on said first bus after said first self-ID phase, wherein after said second self-ID phase said interface link layer device has no node ID and is transparent to said one or more nodes local to said first bus; and
    means for simulating or replacing, in lieu of at least one of said nodes local to said second bus, time critical self-ID packets to be effected on said first bus based on said received information about said one or more nodes local to said second bus, wherein a simulation takes place during said second self-ID phase.

3. The device of claim 2, wherein said simulation is carried out independently of said respective node local to said second bus.

4. The device of claim 2, wherein communication on said first bus is effected in accordance with a predefined protocol having predefined timeouts; and said bridge is adapted to support communication in a manner exhibiting communication delays on the order of or larger than a shortest timeout of said protocol.

5. The device of claim 2 wherein said net is a net fulfilling the IEEE 1394 standard.

6. The device of claim 2, comprising means for simulating a topology of said at least one node local to said second bus.

7. An interface link layer device for use in a network comprising a first sub-network having one or more nodes, a second sub-network having one or more nodes and a long delay link via which said first and second sub-networks are connected, said interface link layer device comprising:
    an interface configured to interconnect said long delay link and said first sub-network;
    said interface configured to receive information about said one or more nodes of said second sub-network stored at another link layer device, which is configured to interconnect said long delay link and said second sub-network;
    a first module configured to initiate a first self-ID phase within said first sub-network due to a connecting/disconnecting of a node to said first sub-network, wherein after said first self-ID phase said interface link layer device has a node ID;
    a second module configured to initiate a second self-ID phase within said first sub-network after said first self-ID phase, wherein after said second self-ID phase said interface link layer device has no node ID and is transparent to said one or more nodes of said first sub-network; and
    a third module configured to simulate, in lieu of at least one of said nodes of said second sub-network, time critical self-ID packets to be effected on said first sub-network based on said received information about said one or more nodes of said second sub-network, wherein a simulation takes place during said second self-ID phase.

8. The interface link layer device according to claim 1, wherein said second self-ID phase is self-initiated by a self-initiated bus reset.

9. A method to operate an interface link layer device connecting a long delay link and a first sub-network of a network, said method comprising:
    receiving information about one or more nodes of a second sub-network stored at another link layer device, which is configured to interconnect said long delay link and said second sub-network;
    initiating a first self-ID phase within said first sub-network due to a connecting/disconnecting of a node to said first sub-network, wherein after said first self-ID phase said interface link layer device has a node ID;
    self-initiating a second self-ID phase within said first sub-network after said first self-ID phase, wherein after said second self-ID phase said interface link layer device has no node ID and is transparent to said one or more nodes of said first sub-network; and
    simulating in lieu of at least one of said nodes of said second sub-network, time critical self-ID packets to be effected on said first sub-network based on said received information about said one or more nodes of said second sub-network, wherein a simulation takes place during said second self-ID phase.

* * * * *